Patented Sept. 23, 1941

2,256,480

UNITED STATES PATENT OFFICE 2,256,480

WELDING GUN

Grover A. Hughes, Seattle, Wash.

Application September 3, 1940, Serial No. 355,129

5 Claims. (Cl. 219—4)

(Granted under the act of March 3, 1883, as amended April 30, 1928; 370 O. G. 757)

This invention relates to means for and a method of welding, particularly end welding.

Among the several objects of this invention are:

To produce a novel welding gun;

To provide means to initiate the welding arc without conductive contact between the parts to be welded;

To utilize a high frequency potential to break down the air gap between spaced electrodes to initiate the welding arc;

To utilize either alternating or direct current in the welding circuit;

To time the duration of the arc with a high degree of accuracy.

In welding studs to plates or structural members by arc welding, considerable difficulty is encountered at times when direct current is used. The flow of direct current through a steel plate sets up magnetic lines of force which influences the arc causing it to be very unstable, revolving rapidly around the stud (or electrode) causing blow holes and slag inclusions in the weld at the points of disturbance and at times completely extinguishing the arc. As a concentration of the heat of the arc must be directly opposite the stud for proper fusion when the arc is forced to one side or rotates around the stud, proper fusion cannot be obtained and welds are defective even when proper material in the stud for welding is used. This phenomenon is known as magnetic blow and increases with high currents, such as are required in vertical and overhead stud welding with the short interval of time necessary to prevent flow of the fused metal. This magnetic blow is so severe at times that good welding is difficult.

Arc blow is decidedly less with alternating current than with direct current and a further advantage of the former is that the nitrogen absorption is notably less. However, since a higher voltage is required to start and maintain an arc with alternating current, using a bare electrode, than with direct current, alternating current has not been used for end welding. Superimposing a voltage of high frequency, of the order of 25,000 to 100,000 cycles, permits initiating the arc without conductive contact between the stud and the work and permits lowering the voltage of the welding transformer to approximately 70 volts. The source of the high frequency potential may be either a spark gap or a vacuum tube oscillator, both of which are well known in the electrical art.

Figure 1:
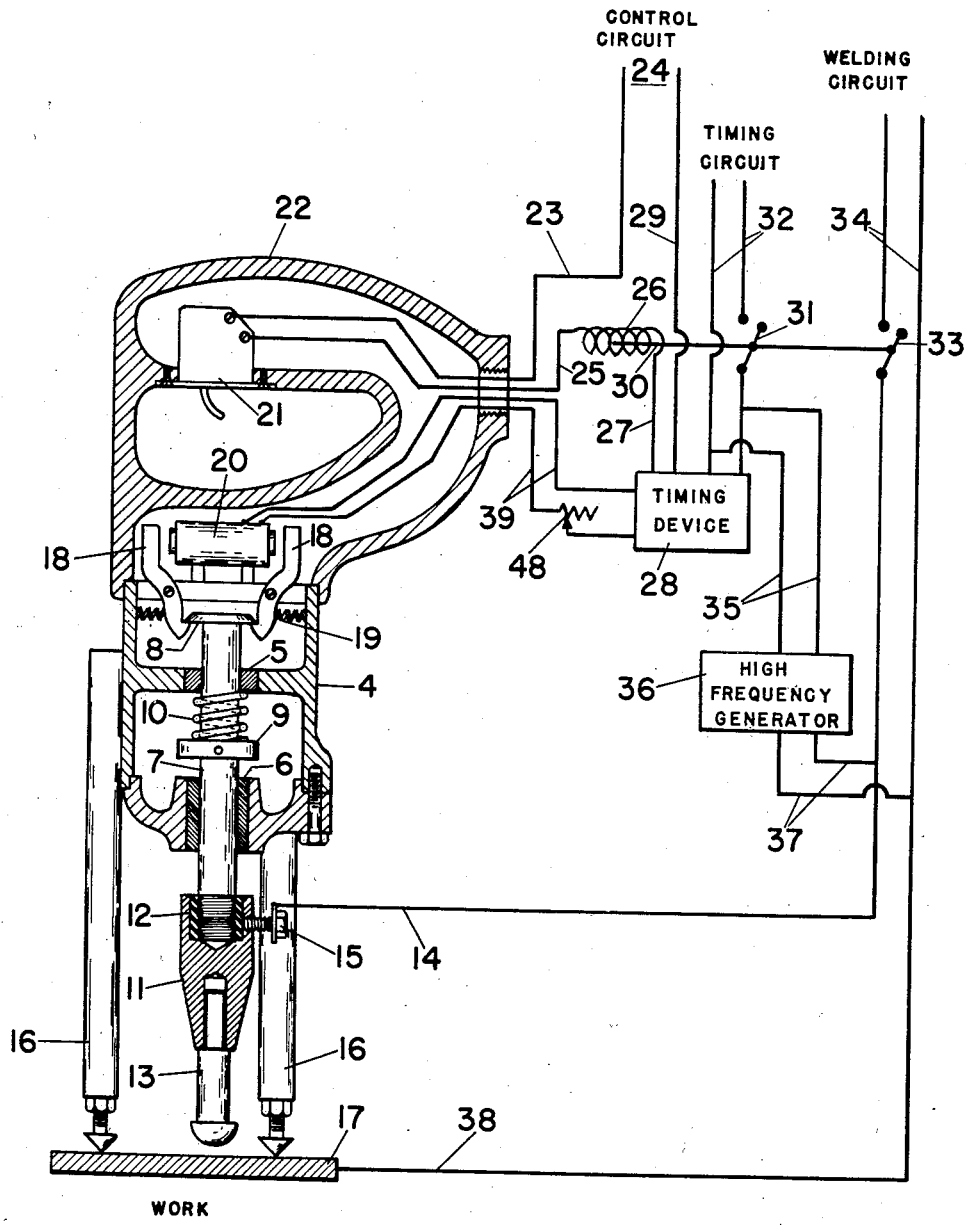
Fig. 1 is a view, substantially in longitudinal section, of a welding gun embodying my invention.

One form of gun for practicing my invention is depicted in Fig. 1. The body member 4 carries bushings 5 and 6 in which is slidably mounted a plunger 7 having at its inner end a head 8 and intermediate the bushings 5 and 6 a collar 9 serving as one abutment for spring 10 which at its other end bears against the bushing 5. A stud holder 11 is fixed to the outer end of plunger 7 and is insulated therefrom by insulating bushing 12, welding current being supplied to stud 13 in holder 11 through welding circuit lead 14 connected to a binding post 15. Legs 16, preferably three in number, are adjustable as to length to permit making the proper spacing between the head of stud 13 and work piece 17 which spacing should be the desired arc length. While legs 16 are indicated as being fixed to body 4, it is to be understood that they may be adjustable thereon in any of the numerous ways known to the art.

Plunger 7 is held in its retracted position, with stud 13 spaced from work 17, by latches 18 engaging head 8, the latches being biased to the locking position by compressed springs 19. Disengagement of latches 18 is effected by energizing a solenoid 20, as will be hereinafter described, which attracts the adjacent ends of latches 18 and rocks the latches about their pivots to release plunger 7, whereupon spring 10 projects plunger 7 outwardly and forces stud 13 into the crater in work 17.

The flow of current is controlled by switch 21 mounted in handle 22. Lead 23 of control circuit 24 is connected to one contact of switch 21 and the other contact thereof is connected to lead 25 through which current flows to energize solenoid 26 and thence through lead 27 to start timing device 28, the return being through lead 29.

When solenoid 26 is energized the coil 30 thereof is actuated and closes switch 31 in timing circuit 32 and switch 33 in welding circuit 34. When switch 31 is closed it supplies energy through leads 35 to set the high frequency generator 36 in operation which, in the event this generator is a vacuum tube oscillator, may be by overcoming a blocking bias. Generator 36 is connected by leads 37 to welding circuit lead 14 and welding circuit lead 38. Consequently, simultaneously with the closing of switch 33 to supply welding current to stud 13 and work 17, the high frequency potential is applied between the stud 13 and work 17. This high frequency potential breaks down the air gap between stud 13 and work 17 so that it becomes conducting and the welding current begins to flow, thus initiating the arc without conductive contact between the two parts to be welded together.

The timing device 28 is set to operate after a predetermined number of cycles of the alternating current supplied to it and when it does so operate solenoid 20 is energized through leads 39, the latches 18 are disengaged, stud 13 is moved into welding contact with work 17, and the control circuit 24 is broken in the timing device by the leads 27 and 29. This breaking of the control circuit deenergizes solenoid 26 which permits spring means (not shown) to open switches 31 and 33, thus breaking the circuits through generator 36 and welding circuit 34.

I have found that in welding to surfaces in vertical or overhead positions that the best type of weld is effected when the duration of the arc is very accurately timed. This is possible by commercially available timers that may be set to operate at any given number of cycles of alternating current within the capacity range of the instrument. This necessity for accurate timing arises from the fact that in the positions mentioned the molten metal in the crater pool will run off if the arc persists too long.

The device is made ready for welding by adjusting the length of legs 16 to suit the length of the stud 13 that is to be used. When a stud 13 is pushed into the stud holder 11 the plunger 7 is moved inwardly, compressing spring 10 and bringing head 8 into locking engagement with the latches 18.

Figure 2:
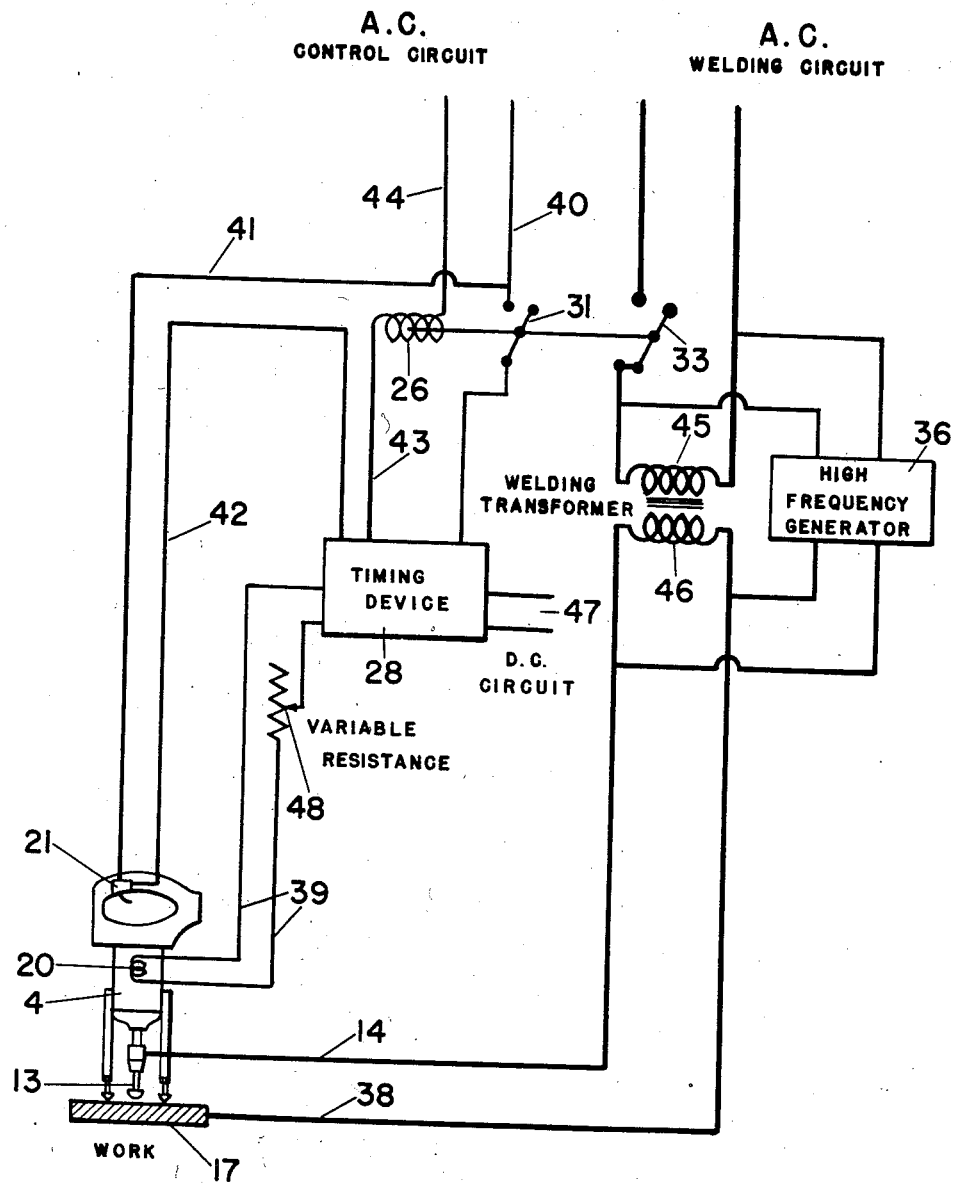
Fig. 2 is a schematic diagram of the circuit connections for utilizing alternating current in the welding circuit.

Fig. 2 illustrates somewhat more in detail the circuits utilized when alternating current is used for welding. Lead 40 of the alternating current control circuit is connected by wire 41 to switch 21 whence the current flows through wire 42 to timing device 28 and thence through wire 43 through solenoid 26 to lead 44. The welding circuit comprises a transformer primary 45 and secondary 46 which is connected to welding leads 14 and 38. High frequency generator 36 is at one side connected across transformer primary 45 and at the other side across secondary 46.

When switch 21 is closed the solenoid 26 is energized and switches 31 and 33 are closed as above described, resulting in the application of both the high frequency potential and the welding voltage between stud 13 and work 17. At the end of the arc period the timing device 28 functions to connect through current circuit 47 to leads 39 to energize the solenoid 20 and plunger 7 is released to effect the bond between stud 13 and work 17. The strength of solenoid 20 may be controlled by a variable resistance 48 in circuit therewith.

Figure 3:
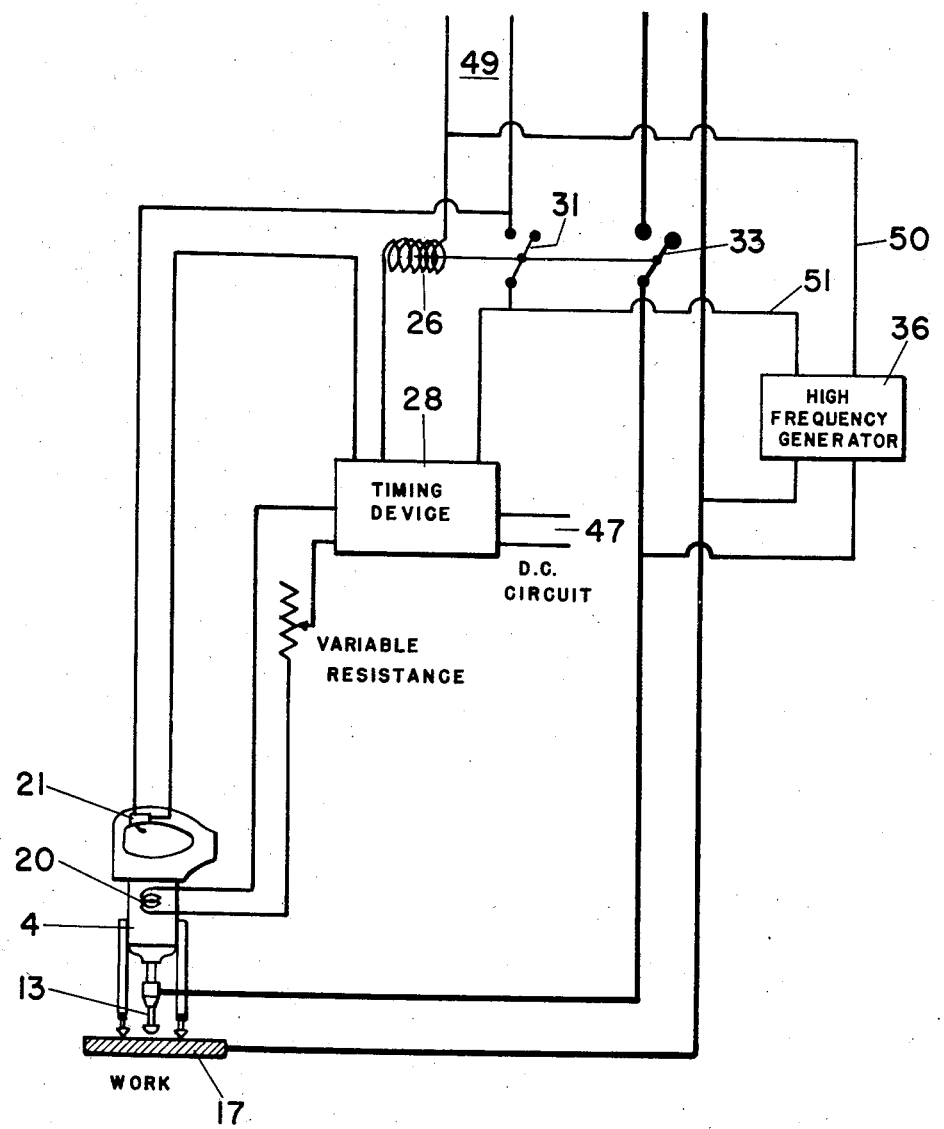
Fig. 3 is a diagram similar to Fig. 2 for using direct current in the welding circuit.

The circuit for utilizing direct current for welding is depicted in Fig. 3. The alternating current control circuit 49 is connected through switch 21 to timing device 28 and solenoid 26 which operates switches 31 and 33. High frequency generator 36 is connected through lead 50 to one side of control circuit 49 and through lead 51 to timing device 28 and to switch 31. Closing switch 21 starts timing device 28 to operating and completes the circuits through switches 31 and 33 with resultant application of welding voltage and high frequency potential to stud 13 and work 17. After the predetermined arc interval, timing device 28 connects through current circuit 47 to solenoid 20 and also breaks the control circuit 49 as above described.

The invention herein described and claimed may be used and/or manufactured by or for the Government of the United States of America for governmental purposes without the payment of any royalties thereon or therefor.

I claim:

1. Welding apparatus, comprising a welding gun having a body, a plunger slidable in said body, a spring around said plunger, an abutment on said plunger at one end of said spring, an abutment on said body at the other end of said spring to cooperate with the aforesaid abutment to compress said spring, a stud holder insulatingly carried by the outer end of said plunger, a head on the inner end of said plunger, latch means disposed to be engageable with said head to hold said plunger when said spring is compressed, electromagnetic means energizable to disengage said latch means from said head, legs fixed to said body and adapted to bear against work to which a stud is to be welded, said legs being adjustable to position the end of a stud in said holder the proper arc distance from said work, means to supply welding current to said stud and said work, high frequency potential supply means connectible in circuit with said stud and said work, a timing device to interrupt said welding current and energize said electromagnetic means a predetermined interval after the arc is established, and control means to close the circuits through said timing device, said high frequency supply and said stud and work, and said welding current supply means, whereby said high frequency potential breaks down the air gap between said stud and said work and initiates the arc.

2. Welding apparatus, comprising a welding gun having a body, a plunger slidable in said body, resilient means acting upon said plunger to urge said plunger outwardly of said body, a stud holder insulatingly carried by the outer end of said plunger, said plunger having latch engaging means at its inner end, latch means engageable with said latch engaging means, electromagnetic means energizable to disengage said latch means, means to position a stud in said stud holder the proper arc distance from a work piece to which such stud is to be welded, means to supply welding current to said stud and said work, high frequency potential supply means connectible in circuit with said stud and said work, a timing device to interrupt said welding current and energize said electromagnetic means a predetermined interval after the arc is established, and control means to close the circuits through said timing device, said high frequency supply and said stud and work, and said welding current supply means, whereby said high frequency potential breaks down the air gap between said stud and said work and initiates the arc.

3. Welding apparatus, comprising a welding gun having a body, stud-carrying means mounted in said body to be movable between a cocked position and a welding position, means to lock said stud-carrying means in cocked position, means energizable to release said locking means, means to urge said stud-carrying means outwardly when said locking means is released, means to position a stud in said stud-carrying means a proper arc distance from a work piece to which such stud is to be welded when said stud-carrying means is in cocked position, means to supply welding current to said stud and said work, high frequency potential supply means connectible in circuit with said stud and said work, a timing device to interrupt said welding current and energize said lock releasing means a predetermined interval after the arc is established, and control means to start said timing device and to apply said high frequency potential and said welding current to said stud and work, whereby said high frequency potential breaks down the air gap between said stud and said work and initiates the arc.

4. Apparatus for end-welding, comprising means to support an element to be end-welded at the proper arc distance from the work piece to which such element is to be welded, means to apply a high frequency potential between said element and said work, means to supply welding alternating current to said element and said work, whereby said high frequency potential breaks down the air gap between said element and said work and establishes the arc, and means responsive to a predetermined number of alternations of said welding current to interrupt said welding current and effect movement of said element into welding contact with said work a predetermined interval after said arc is established.

5. Welding apparatus, comprising a welding gun having a body, a plunger slidable in said body, a spring around said plunger, an abutment on said plunger at one end of said spring, an abutment on said body at the other end of said spring to cooperate with the aforesaid abutment to compress said spring, a stud holder insulatingly carried by the outer end of said plunger, a head on the inner end of said plunger, latch means disposed to be engageable with said head to hold said plunger when said spring is compressed, electromagnetic means energizable to disengage said latch means from said head, legs fixed to said body and adapted to bear against work to which a stud is to be welded, said legs being adjustable to position the end of a stud in said holder the proper arc distance from said work, means to supply welding current to said stud and said work, a timing device to interrupt said welding current and energize said electromagnetic means a predetermined interval after the arc is established, and control means to close the circuits through said timing device and said welding current supply.

GROVER A. HUGHES.